(12) United States Patent
Purdy et al.

(10) Patent No.: US 9,114,982 B2
(45) Date of Patent: Aug. 25, 2015

(54) QUANTUM DOTS IN ELECTRONIC DEVICE EXTERIOR SURFACE

(75) Inventors: Michael Lorne Purdy, Kitchener (CA); Bergen Albert Fletcher, Kitchener (CA); James Alexander Robinson, Elmira (CA)

(73) Assignee: BlackBerry Limited, Waterloo (CA)

(*) Notice: Subject to any disclaimer, the term of this patent is extended or adjusted under 35 U.S.C. 154(b) by 792 days.

(21) Appl. No.: 13/110,075

(22) Filed: May 18, 2011

(65) Prior Publication Data
US 2012/0292169 A1 Nov. 22, 2012

(51) Int. Cl.
*H01H 13/83* (2006.01)
*B82Y 20/00* (2011.01)

(52) U.S. Cl.
CPC ............ *B82Y 20/00* (2013.01); *H01H 13/83* (2013.01); *H01H 2219/036* (2013.01); *H01H 2219/06* (2013.01); *H01H 2300/036* (2013.01)

(58) Field of Classification Search
USPC .......... 362/23.01, 23.03, 23.05, 23.07, 23.08, 362/23.09, 23.1, 23.11, 23.12, 23.13, 23.17, 362/23.19, 23.2
See application file for complete search history.

(56) References Cited

U.S. PATENT DOCUMENTS

| | | | |
|---|---|---|---|
| 7,399,654 B2 * | 7/2008 | Lin et al. | ............... 438/57 |
| 7,869,117 B2 | 1/2011 | Choi et al. | |
| 2005/0157368 A1 * | 7/2005 | Vang et al. | ............... 359/248 |
| 2006/0227532 A1 * | 10/2006 | Ko et al. | ............... 362/85 |
| 2008/0224596 A1 | 9/2008 | Park et al. | |
| 2009/0017268 A1 | 1/2009 | Skipor et al. | |
| 2009/0059554 A1 * | 3/2009 | Skipor et al. | ............... 362/29 |
| 2010/0091225 A1 | 4/2010 | Cho et al. | |
| 2010/0277890 A1 * | 11/2010 | Lewis et al. | ............... 362/84 |

OTHER PUBLICATIONS

Extended European Search Report issued on EP Application No. 111664959.9; mailed Sep. 30, 2011; 8 pages.
Chanson, M. et al.; "Free-standing quantum dots for electronic applications"; Proceedings of Spie; The International Society for Optical Engineering; vol. 6479, Feb. 2, 2007; USA; 8 pages; XP-002500571.
Office Action; Canadian Application No. 2777138; Jul. 22, 2014.

(Continued)

*Primary Examiner* — Stephen F Husar
*Assistant Examiner* — Danielle Allen
(74) *Attorney, Agent, or Firm* — Ridout & Maybee LLP

(57) ABSTRACT

Applying quantum dots to surface features of an electronic device to augment or replace reflective and transmissive features. Applying quantum dots can yield more efficient illumination of those features and can permit use of diverse internal light sources to cause those features to emit any color of visible light. An electronic device, keyboard for same and method of applying features to areas of the exterior surface of an electronic device are provided. Quantum dots are applied to an area of the exterior surface that is illuminated by the device's internal light source. The quantum dots absorb incident light then emit predetermined longer wavelength light. The interior light may be a UV light, high energy light emitting diode, or back light. The quantum dots can be applied to exterior surfaces, buttons or key on electronic devices, mobile devices, and keyboards for mobile devices.

23 Claims, 7 Drawing Sheets

(56) References Cited

OTHER PUBLICATIONS

Chason M. et al,: "Free-standing quantum dots for electronic applications", Proceedings of SPIE, The International Society for Optical Engineering SPIE, USA, vol. 6479, Feb. 2, 2007, pp. 64790E-1, XP002500571.

Communication pursuant to Article 94(3) EPC; EP 11166495.9; Jan. 8, 2015.

* cited by examiner

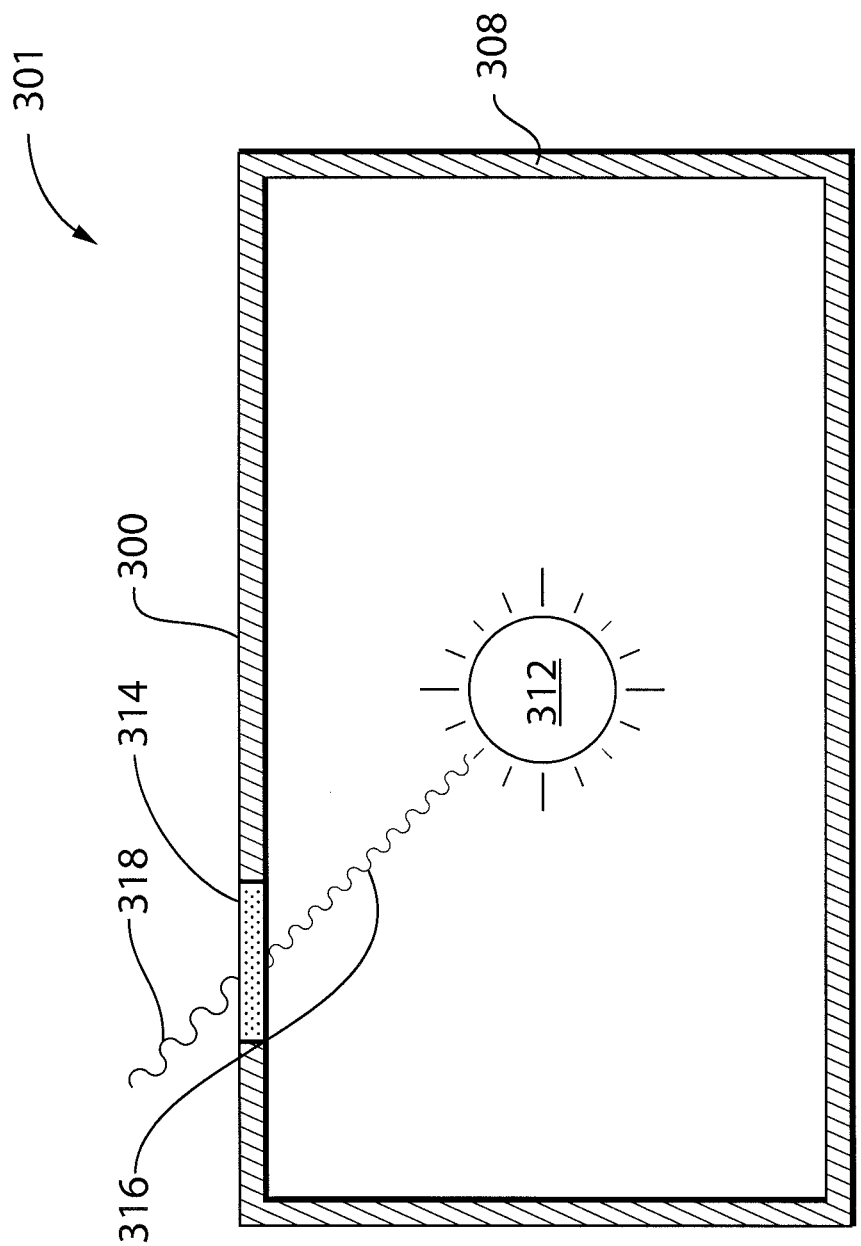

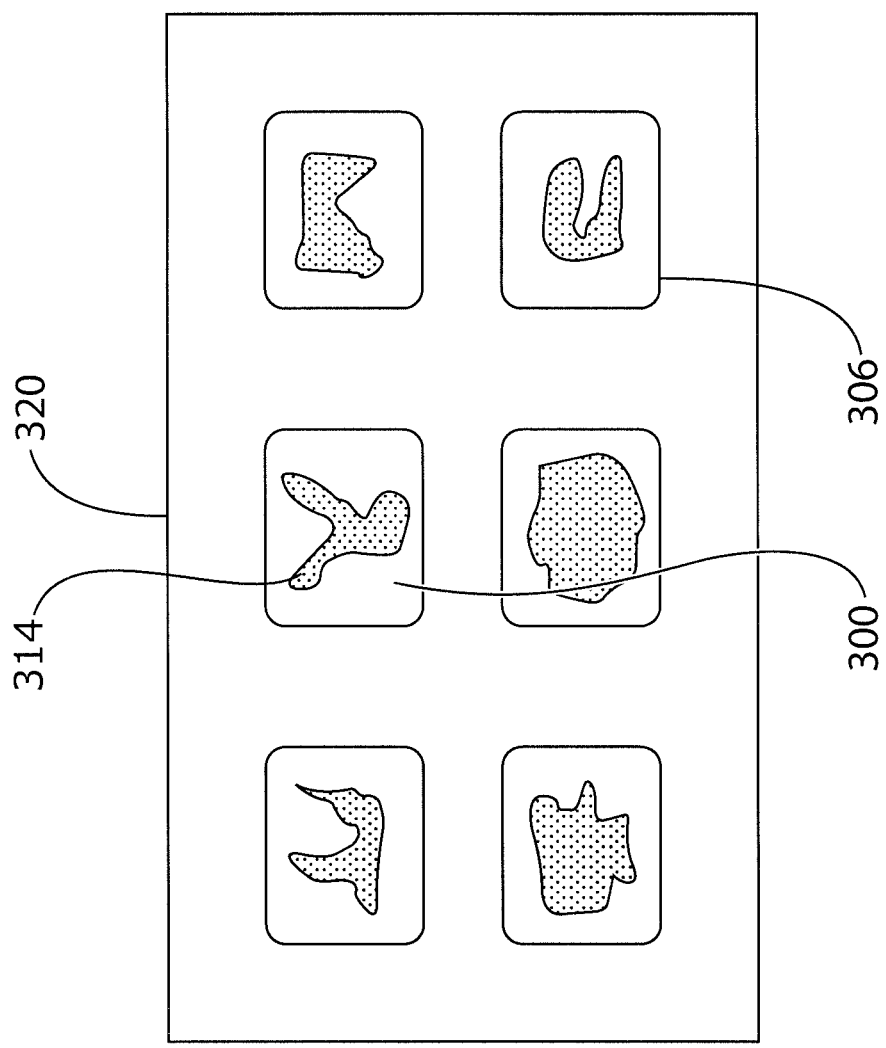

QUANTUM DOTS IN ELECTRONIC DEVICE EXTERIOR SURFACE

TECHNICAL FIELD

The present disclosure relates generally to illuminating features on the exterior of an electronic device.

BACKGROUND

Typically, an electronic device will have features on its exterior surface which provide visual cues to the user to assist him or her when interacting with the device. In this context, a feature is a letter, symbol, shape or combination thereof having some color or combination of colors. For example, the IEEE 1621 standard symbol for power ⏻ may appear in red on a button of a mobile device while the manufacturer's trade-mark may appear in white elsewhere on the device's black exterior surface. The features considered herein should not be limiting and may comprise any shapes and any colors which provide visual cues for the user.

To make features visible in a wide range of lighting conditions, the features commonly reflect light from external sources and transmit light from an internal light source within the electronic device.

Typically, external light sources, such as the sun or office florescent tube lighting, emit light including wavelengths from all parts of the visible spectrum of light. This is more pleasing to the eye than light sources having a narrow visible spectrum or containing fewer wavelengths of visible light. Furthermore, when incident light contains a broad visible spectrum of light, any color can be selected for a feature and that color can be reflected from the broad spectrum external light.

Light sources internal to an electronic device similarly usually provide a broad spectrum of incident light so that any color can be selected for a feature and that color can be transmitted through the feature from the broad spectrum internal light. If an internal light source did not include a broad spectrum of visible light, the available colors that features could transmit would be limited by the spectrum of the internal light source. For example, a dishwasher with a blue internal light could not correctly illuminate red, green, yellow or white colored features solely by transmission of its blue light through those features.

BRIEF DESCRIPTION OF THE DRAWINGS

FIG. 2A is a partially cut away side view of an electronic device in accordance with an example embodiment of the present disclosure;

FIG. 2C depicts a keypad in accordance with another example embodiment of the present disclosure;

Like reference numerals are used in the drawings to denote like elements and features.

DETAILED DESCRIPTION OF EXAMPLE EMBODIMENTS

Figure 1:
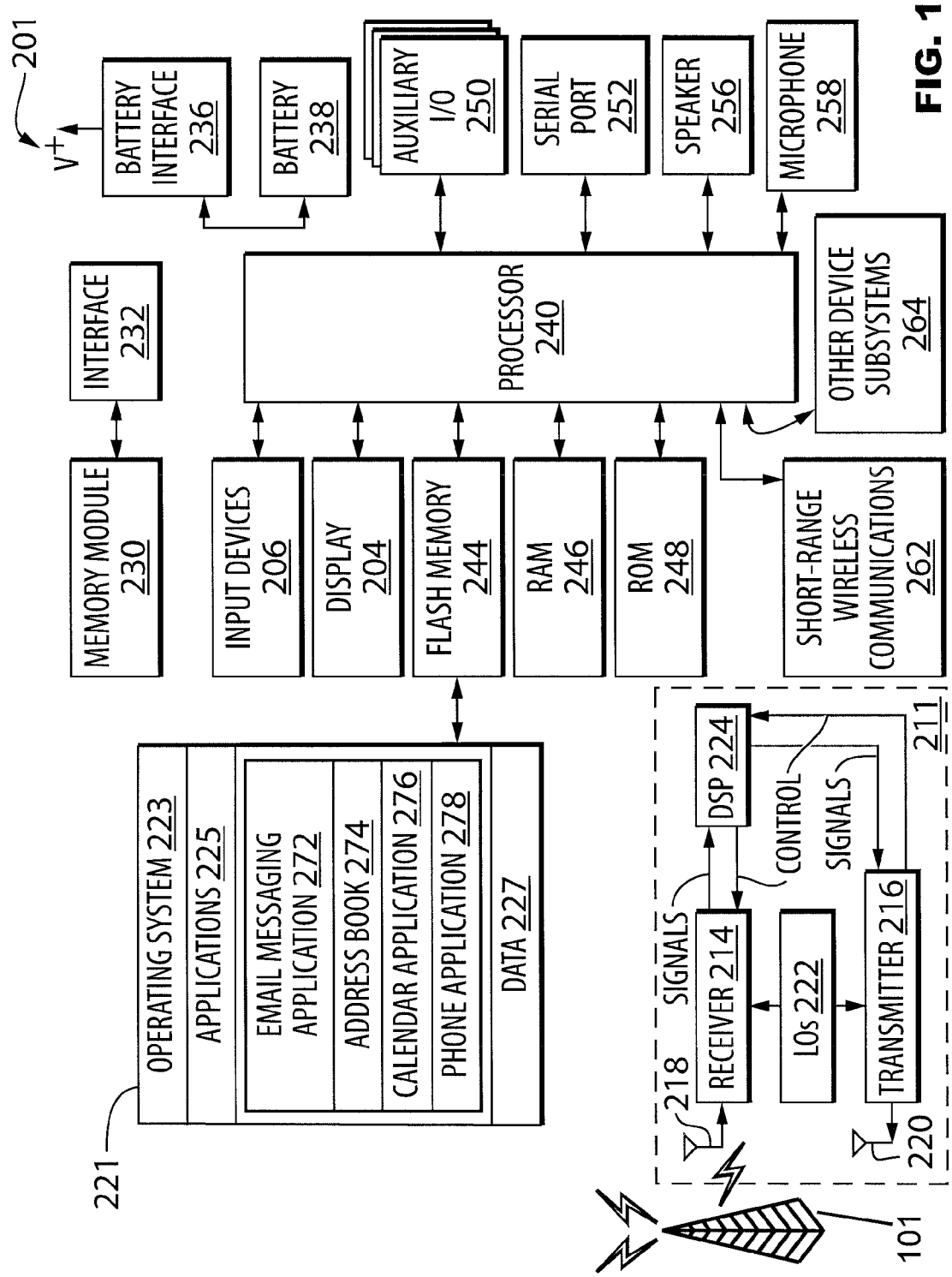
FIG. 1 is a block diagram illustrating a mobile communication device in accordance with one example embodiment of the present disclosure.

The present disclosure applies quantum dots to a feature of an electronic device to augment or replace reflective and transmissive colorants. The inclusion of quantum dots permits the use internal light sources emitting high energy, short wavelength, non-white light without restricting the potential colors or intensity of features illuminated on the device. Applying quantum dots to features of an electronic device also makes more efficient use of the light provided by the light source and may reduce the energy used by the device to illuminate a broad spectrum of colored features. Efficiency may be increased because the intensity of short wavelength light is less reduced by filtering and absorption effects and because quantum dots use any higher energy light to emit a specific lower energy wavelength while reflective or transmissive colorants without quantum dots cannot use other wavelengths of light to increase the emission of their particular color.

A quantum dot is type of small particle that absorbs, and is excited by, incident light. If the energy absorbed from the incident light is great enough, this excitation causes the quantum dot to emit light at a specific, lower energy, longer wavelength. Accordingly—and unlike reflection and transmission by other colorants—absorption and emission by quantum dots can change the wavelengths (and hence color) of the light involved. The wavelength of light emitted depends on the size of the quantum dot. The smaller the size of the quantum dot, the shorter the wavelength of the emitted light. Because the size of a quantum dot can be controlled when the quantum dot is manufactured, it is possible to create quantum dots that will emit any wavelength in the visible spectrum. Furthermore, a mixture of different sized quantum dots can be made which can emit a spectrum of visible light comprising a number of wavelengths. For example, a mixture of different quantum dot sizes illuminated solely by non-visible ultraviolet light can produce visible white light.

Some quantum dots are semiconductors whose excitons are confined in all three spatial dimensions. Some quantum dots are nanocrystals. Some quantum dots are reactive to moisture and air and are conventionally manufactured to prevent exposure of the quantum dots.

When an electronic device is designed to illuminate features of any possible color from an internal light source, that internal light source should provide a spectrum of light including all visible wavelengths so that features of any color can be illuminated by the light source. This restriction is based on the principle that reflection and transmission of light generally cannot change the wavelength (or color) of the light involved. Accordingly, to illuminate all colors of features, the light source must contain all colors of light. By applying quantum dots to a color feature of an electronic device, the quantum dots can generate different wavelengths of light than the wavelengths provided by the light source.

Without quantum dots, a reflective or transmissive red colored feature appears red under broad spectrum light because it absorbs all incident wavelengths except red, which is reflected or transmitted and thus visible to an observer. If that red feature was illuminated solely by blue light, it would appear dark to an observer because the feature absorbs the blue light and has no red light to reflect or transmit. By applying quantum dots of a particular size to the red feature, a portion of the higher energy, shorter wavelength, blue light is absorbed by the quantum dots and re-emitted as red light. Some blue light will pass through undisturbed. The amount of blue light that is absorbed and re-emitted as red light depends on the density of the quantum dots in the feature.

In some electronic devices, a high intensity white light emitting diode (LED) has been used to provide a broad spectrum visible light source. However, even the best white LEDs provide uneven intensities of colors. In some electronic devices, red features illuminated by these white LEDs will appear to have reduced color saturation in comparison to other colored features illuminated by the same light source.

Without quantum dots, any light of non-red wavelengths that is absorbed by the red feature represents energy that was wasted by the electronic device. By applying quantum dots to the red colored feature, even if the white LED light source does not change, the higher energy light from the source can be absorbed by the quantum dots causing more red light, or greater intensity red light, to be emitted. Thus applying quantum dots to the red feature can increase the efficiency of the device by increasing the intensity of light emitted by the colored feature.

Quantum dots applied to an area of the exterior surface of an electrical device permit light emitted from the quantum dots to be visually perceived by a user interacting with the device. For the quantum dots to emit light by excitation from a light source internal to the device, the internal light source must illuminate the quantum dots. In environments where there is little external light, illumination and excitation by the internal light source permits emission of light by the quantum dots which makes the features of the electronic device visible to the user.

The quantum dots can also be illuminated by external light sources and will similarly absorb and emit light if the incident light is of sufficiently short wavelength, high frequency or high energy.

One aspect of the present disclosure provides an electronic device comprising: an internal light source, a housing having an exterior surface and a quantum dot mixture applied to an area of the exterior surface. The quantum dots mixture emits a spectrum of light in response to illumination from the light source.

Another aspect of the present disclosure provides a keypad for an electronic device having an internal light source. The keypad comprises a plurality of keys each having an exterior surface and a quantum dot mixture applied to an area of an exterior surface of at least one key. The quantum dot mixture emits a spectrum of light in response to illumination from the light source.

A further aspect of the present disclosure provides a method for providing a feature on an exterior surface of an electronic device having an internal light source. The method comprises: defining an area of the exterior surface that is illuminable by the internal light source and applying quantum dots to the area in the shape and color of the feature.

Reference is first made to FIG. 1 which illustrates an exemplary embodiment of a mobile communication device (mobile device) 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown in FIG. 1) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 (sometimes referred to as a radio layer) for exchanging radio frequency signals with a wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 1 perform communication-related functions, whereas other subsystems may provide "resident" or on-device functions.

The device 201 may comprise a touch screen display in some embodiments. The touch screen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller. In some embodiments, a touch screen is integrated directly with the display. In still other embodiments, a touch screen is placed behind the display.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 1, the software modules 221 comprise operating system software 223, software applications 225 comprising an email messaging application 272 (also referred to as an email client 272), a personal address book 274, a calendar application 276, and a phone application 278.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a touchpad, a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card or module 230 (typically comprising flash memory) and a memory card interface 232. Network access is typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

The present disclosure applies quantum dots to an exterior surface of an electronic device such as a mobile communication device 201 or any of the other electronic devices described in respect of FIG. 1. The breadth of possible electronic devices contemplated is very large. Any electronic device that includes an internal light source for illuminating the exterior surface of the device can have quantum dots applied according to the present disclosure. Quantum dots can also be applied advantageously to electronic devices having external features that should be visible to the user when there is no or minimal external light. For the purposes of explanation, the present disclosure uses mobile communication device 201 as an example of any electronic device. The present disclosure may also be applied as a reflective surface on an electronic or a non-electronic device to absorb light from a light source and emit a desired wavelength or wavelengths of light.

Referring to FIG. 2A, a cut away side view of an embodiment of the present disclosure is illustrated. An electronic device 301 comprises an internal light source 312, a housing 308 having an exterior surface 300 and a quantum dot mixture 314. The quantum dot mixture 314 emits a spectrum of light 318 in response to illumination 316 from the light source 312.

Figure 2B:
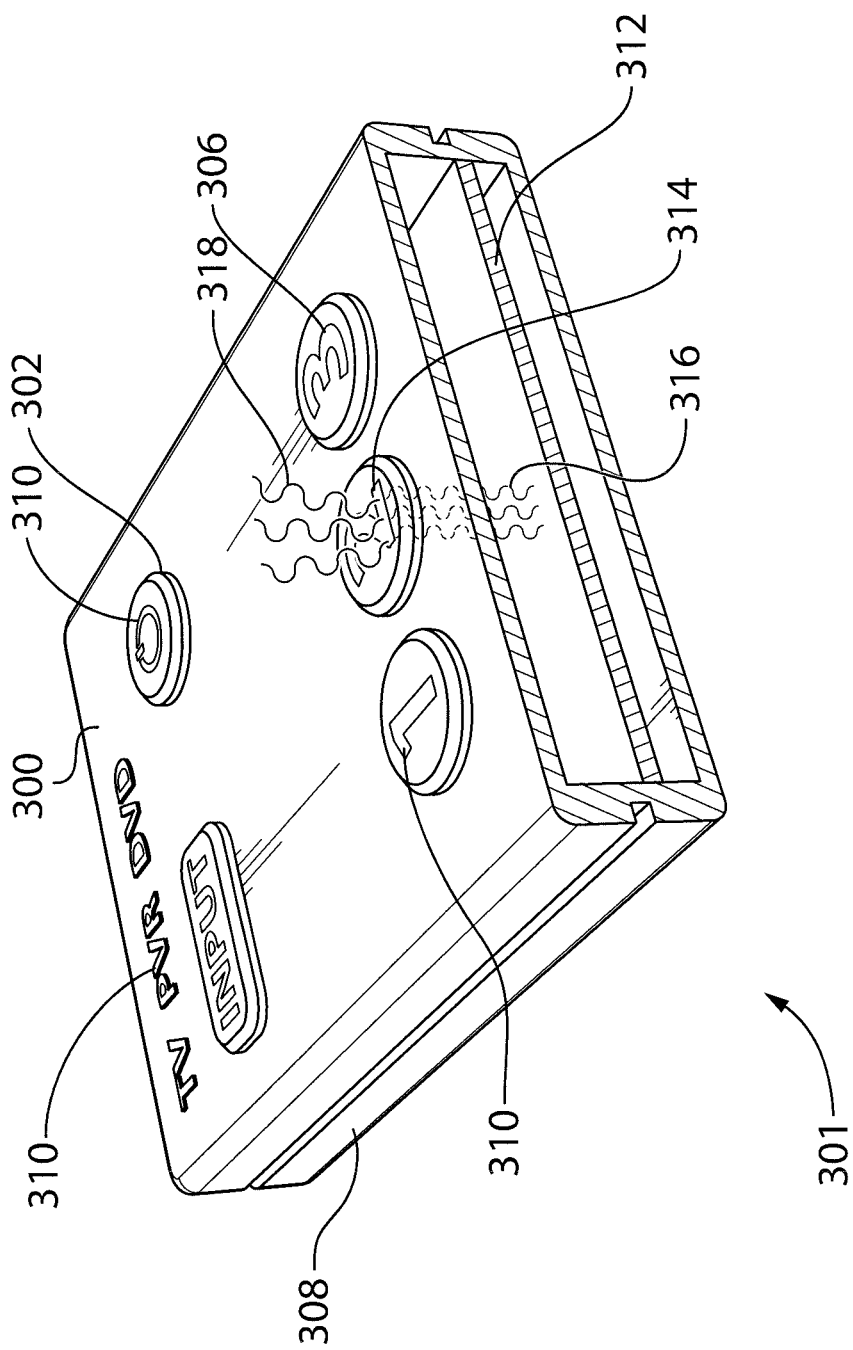
FIG. 2B is a partially cut away perspective view of an electronic device in accordance with an example embodiment of the present disclosure.

In FIG. 2B, a partially cut away embodiment of an electronic device 301 is illustrated. The electronic device 301 comprises a housing 308 having an external surface 300 and an internal light source 312. The external surface 300 includes buttons 302 and a keypad 304 having a plurality of keys 306. Features 310 are disposed in areas of the external surface 300 including areas of the buttons 302, and keys 306. The internal light source 312 emits light 316 which is absorbed by a quantum dot mixture 314, exciting quantum dots in the quantum dot mixture 314 which then emit lower energy, longer wavelength, light 318.

Referring to FIG. 2C, a partially cut away embodiment of a keypad 320 according another embodiment of the present disclosure is illustrated. The keypad 320 comprises a plurality of keys 306 each having an exterior surface 300. A quantum dot mixture 314 is applied to an area of the external surface 300 of at least one key 306. The quantum dot mixture 314 emits a spectrum of light (not shown in FIG. 2C) in response to illumination from an internal light source (not shown in FIG. 2C) of an electronic device that receives the keypad 320.

Figure 2D:
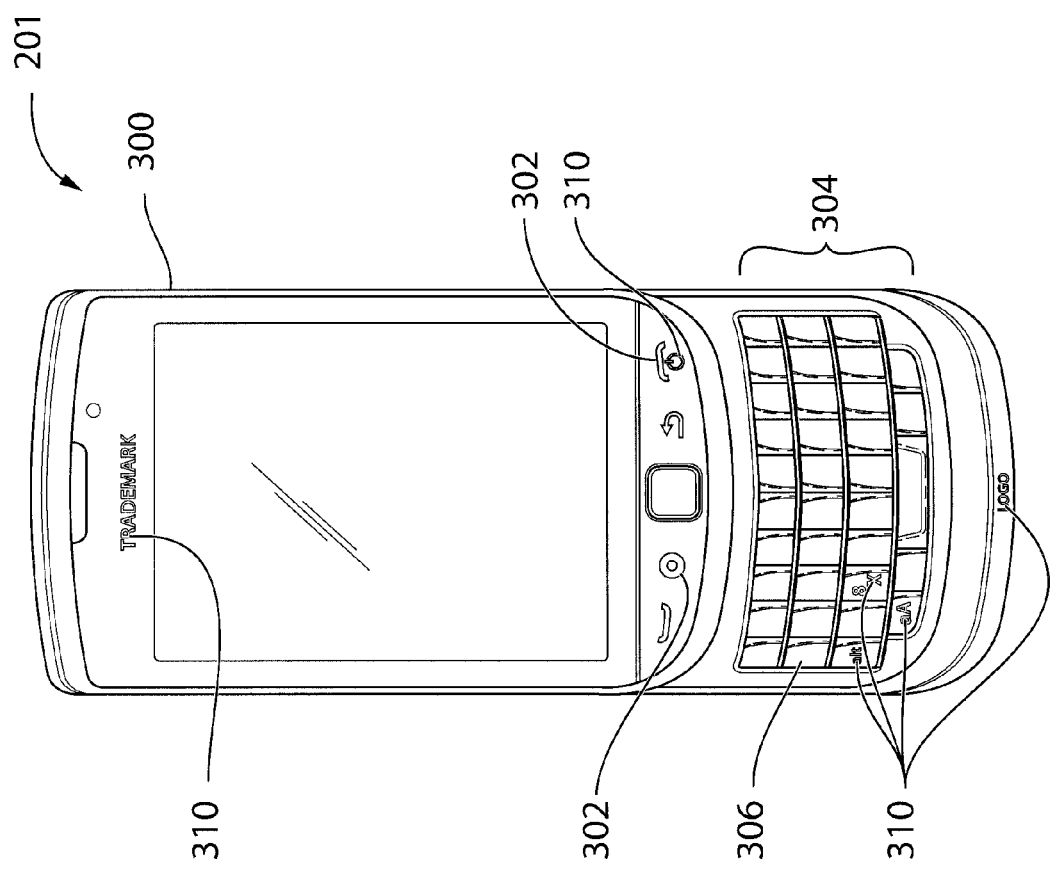
FIG. 2D illustrates a mobile communication device in accordance with one example embodiment of the present disclosure.

In FIG. 2D, portions of an exterior surface 300 of a mobile communication device 201 are illustrated. The illustrated exterior surface 300 comprises a rigid case housing the components of mobile device 201. The exterior surface 300 includes buttons 302 and a keyboard 304 having a plurality of keys 306. Features 310 are provided on areas of the exterior surface 300 to visually contrast with the remainder exterior surface 300 and provide visual cues for a user interacting with the mobile device 201. The features in FIG. 2 are provided in areas of the buttons 302, keys 306 and other portions of the exterior surface 300. Features 310 may take the form of letters, symbols, trade-marks and logos. The visual design of features 310 is unlimited: the features may be provided in any colors and may take on any shapes. In some embodiments, a feature spans over or is integrated into one or more buttons or other portions of the exterior surface 300.

In some embodiments, such as that shown in FIG. 2, portions of the exterior surface 300 are not always exposed on the electronic device. The mobile device 201 in FIG. 2 is illustrated in an open configuration. In a closed configuration of an embodiment, a portion of the exterior surface 300, including the keypad 304, slides behind the display and buttons 302 temporarily hiding the keypad 304 and part of the exterior surface 300 from view. Other examples of exterior surfaces which may, from time to time be hidden from view include surfaces on the inside of a closed flip or clamshell shaped mobile device, or on the surface of a keyboard of a closed laptop computer.

Figure 3:
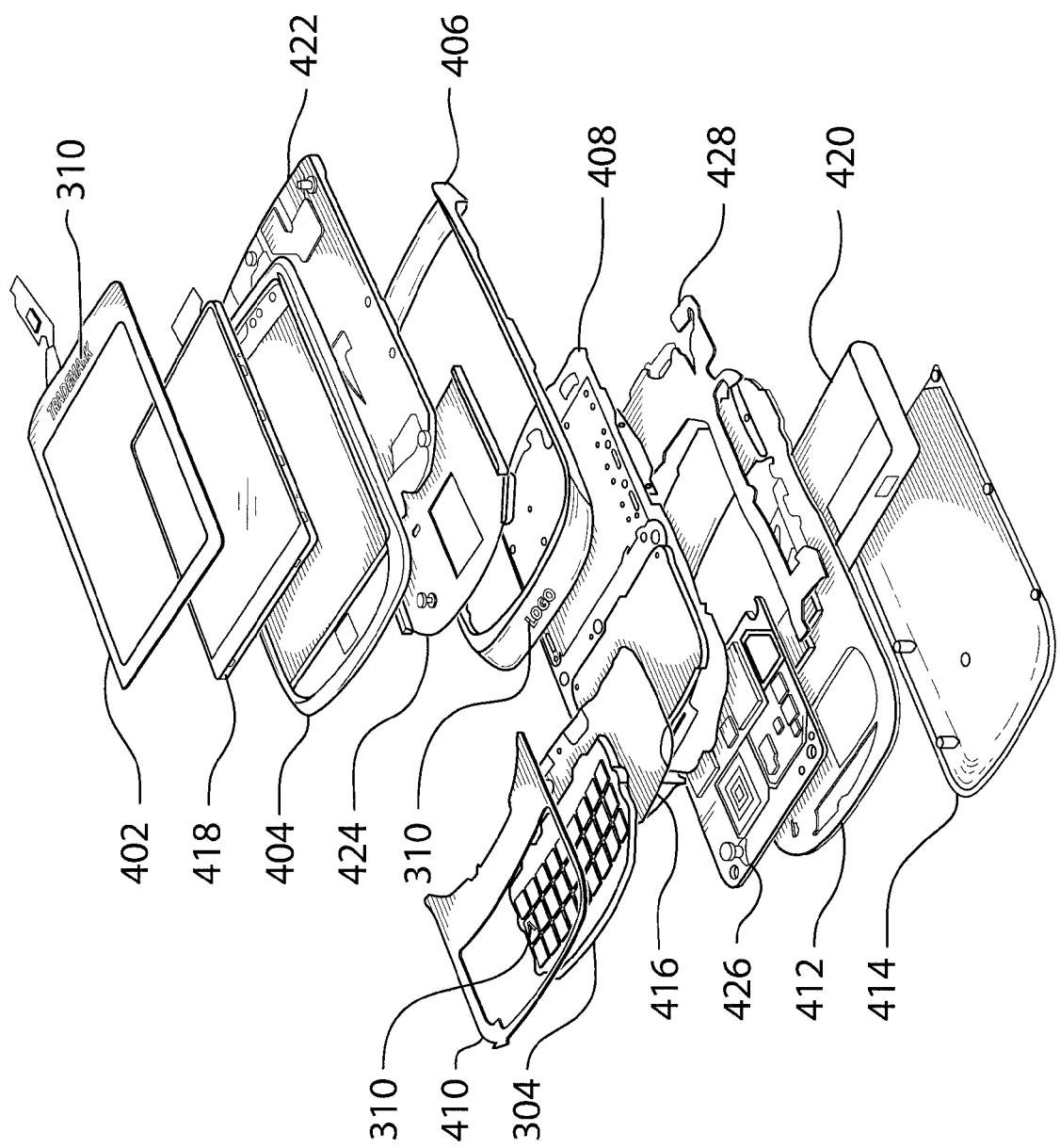
FIG. 3 is an exploded view of a mobile communication device in accordance with one example embodiment of the present disclosure.

Referring now to FIG. 3 an exploded view some of the physical components within an example mobile communication device 201 is illustrated. When assembled, portions of many different physical components form the exterior surface 300. These include the top frame 402, the display enclosure 404, the first and second lateral frames 406, 408, the keypad frame 410, the keypad 304, the bottom frame, 412 and the back cover 414 along with various buttons (not shown in FIG. 3). Other physical components illustrated in FIG. 3 include the keypad printed circuit board (PCB) 416, display 418, the battery 420, first and second slider assemblies 422, 424, interconnect 426 and mainboard 428. In this embodiment the internal light source comprises the keypad printed circuit board 416 and the display 418. When assembled, light emitted from these sources can illuminate the features 310 of the external surface.

An area of the exterior surface 300 bearing a feature 310 will generally comprise a light transmissive material so that light from an internal light source can excite quantum dots in the feature 310. The feature 310 may comprise a quantum dot mixture which is painted or sprayed onto the area of the exterior surface 300. Such paint may be applied directly to an exterior surface or on the inside of the exterior surface beneath a light transmissive material, screen printed or applied by an in mold decoration process. When applied to an external surface, a further protective coating and other light transmissive layers may also be applied over the quantum dots. Quantum dots may also be applied in the shape of a feature 310 by applying a stamp, adhesive, coating or film to the exterior surface 300. In some example embodiments, quantum dots are applied to a feature 310 by a screen printing process or applied by an in mold decoration process, such as when forming a key, keypad or a painted cover lens. In some example embodiments, a filter containing quantum dots may be applied to or within the exterior surface 310 to form a feature 310. In some example embodiments the quantum dots may be injected into the light transmissive material as it is being formed into a portion of the exterior surface 300, such as a key 306 or button 302.

The quantum dot mixture that is applied to an area of the exterior surface 300 to form a feature 310 may include other colorants including reflective and/or transmissive colorants, pigments, dyes and combinations thereof. Providing a combination of quantum dots, reflective colored particles and transmissive colored particles generates a feature 310 that can provide color in a greater range of lighting environments. For example, reflective and transmissive color particles can provide color to the feature 310 when the electronic device is observed in external light that includes more light in the visible spectrum than in ultraviolet or higher energy portions of the spectrum. For example, sunlight may have a greater irradiance or intensity of visible light than higher energy ultraviolet light. In such environments, the reflective and transmissive color particles could provide more colored light to the feature than would be provided by the quantum dots. Including reflective and transmissive colored particles can improve the visibility of a feature 310 in these external lighting conditions.

In environments with low external light, the internal light source provides light to the features so they can be visible to a user. The internal light source typically illuminates the features from within the electronic device. When only reflective and transmissive color particles are used in the features 310, a white internal light source is frequently used to illuminate features of any color in the visible spectrum. A significant portion of the white light is absorbed by the reflective and transmissive color particles. For example, a red colorant will absorb the green and blue components of the incident white light but reflect and transmit the red light component. Accordingly, using only reflective and transmissive color particles inefficiently absorbs much of the white light that was generated by a white internal light source. In contrast, quantum dots can be used with a higher energy light source such as a blue LED light or an ultraviolet backlight unit but all of the light emitted by the light source can be used by the quantum dots to emit light of different colors depending on the particular size or sizes of the quantum dots in the feature 310. In this manner, a feature containing quantum dots permits more efficient use of the light generated by an electronic device's internal light source and thereby may more efficiently use the power supplied by the electronic device to the light source.

Furthermore, a white backlight unit generally requires a higher irradiance or intensity to adequately illuminate reflective and transmissive colored particles in features of an electronic device. Because the light from the internal light source must pass through light transmissive material, its intensity is reduced before reaching the feature 310. Accordingly, the intensity of the internal light source of the present disclosure can be reduced because less light is lost travelling through the transmissive material.

Internal light sources that provide a single narrow spectrum of visible light wavelengths (such as a blue or ultraviolet LED) can be less expensive than internal light sources that provide a broad spectrum of visible light wavelengths (such as a white or RGB LED).

By applying quantum dots to the features of the electronic device, it is also possible to reduce the presence of visible backlight bleed when the internal light source is on and the device is in a low external light environment. By applying quantum dots to the features, an internal light source may be used which contains very little, if any, light in the visible spectrum but contains light of a shorter wavelength, such as ultraviolet light. Accordingly, there will be very little or no visible backlight bleed but the quantum dots will emit visible light illuminating the features of the electronic device.

By applying quantum dots to features to be illuminated and using an internal light source above the visible spectrum, it also may be unnecessary to design the exterior surface using opaque materials surrounding the features. With traditional visible spectrum back lights, opaque materials surrounding the features were necessary to block backlight bleed. In the present disclosure, because the backlight bleed may not form any part of the visible spectrum, the remainder of the exterior surface is not required to block visible light.

Returning to FIG. 3, both the keypad PCB 416 and parts of the display 404 are examples of internal light sources of the electronic device. These internal light sources illuminate features 310 in areas of the exterior surface 300. For example, the keypad PCB 416 illuminates features 310 of the keypad 304 while parts of the display 404 illuminate the trademark feature 310 (more clearly shown in FIG. 2) of the top frame 402 and the logo feature 310 (also more clearly shown in FIG. 2) of the first lateral frame 406. In some embodiments, the internal light source emits high energy light spanning a narrow range of wavelengths. Many other configurations of an electronic device having an internal light source for illuminating quantum dots applied to area of the electronic device's external surface that can be illuminated by the internal light source are contemplated.

Unlike a light source containing quantum dots, the present disclosure applies quantum dots to a feature of an electronic device's external surface. This provides several differences. First, a smaller quantity of quantum dots may be used in the present disclosure than the quantity necessary for a quantum dot light source. Instead of applying quantum dots to the entire light source or a large surface, quantum dots are applied to specific areas of the exterior surface 300 that define features of the electronic device. Second, the lifespan of the quantum dots in the present disclosure may be longer than the lifespan of quantum dots applied within a quantum dot light source because the quantum dots are located further away from the light source than in a quantum dot light source. Third, the quantum dot mixture in the present disclosure can be applied in different colors and shapes to each individual feature.

The present disclosure also contemplates applying quantum dots to components of an electronic device. These components may be manufactured separately from the electronic device and the internal light source and latter assembled or connected to the electronic device. For example, a replacement housing or keypad 304 for a mobile communication device 201 may be manufactured with quantum dots applied according to the present disclosure and the component may be sold independently of the associated electronic device. Referring to FIG. 3 portions of the exterior surface 300 such as the top frame 402, first lateral frame 408 and keypad 304 or buttons 302 and keys 206 can be independently manufactured for use in an electronic device having an internal light source. In some embodiments, these components may have an integrated internal light source. For example, a keypad having features containing quantum dots may form an integral unit with a backlight and that unit can be used to customize an existing electronic device. The keypad may comprise a plurality of keys any number of which may include features having quantum dots. Different quantum dot mixtures may be applied to different features on the same key or different keys. In this manner, different features may appear in different colors on the same keys and keypad.

Figure 4:
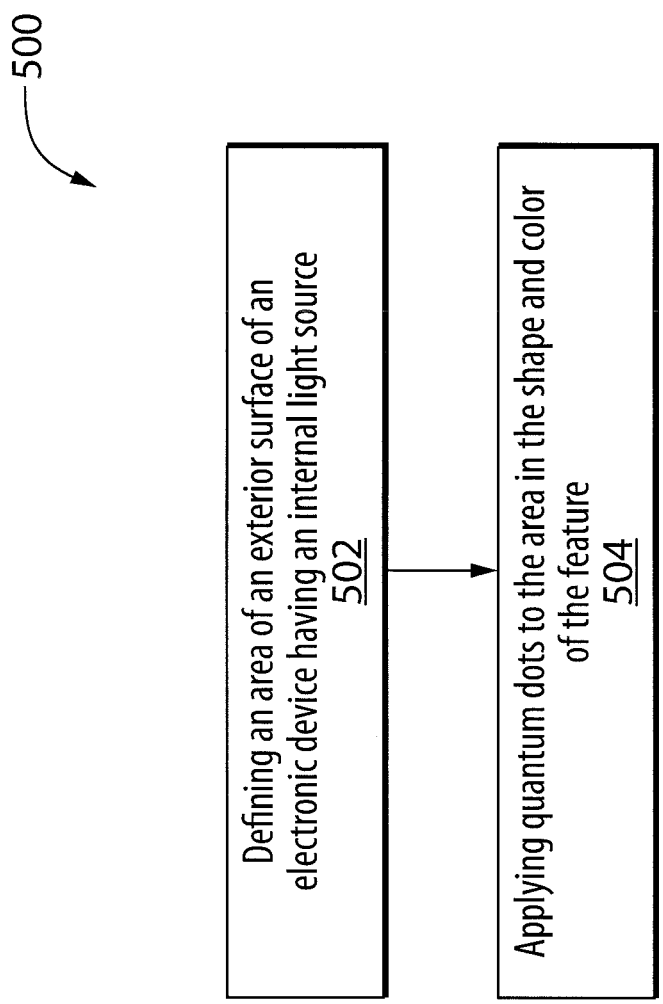
FIG. 4 is a block diagram illustrating an example method embodying the present disclosure.

Referring to FIG. 4, an example method 500 for providing a feature on an exterior surface of an electronic device having an internal light source is illustrated. The method includes defining 502 an area of the exterior surface that is illuminable by the internal light source of the electronic device and applying 504 quantum dots to the area in the shape and color of the feature.

The light source of the electronic device comprises any one of an ultraviolet light, a light emitting diode, a backlight unit, a laser and other light sources. The light source emits light having sufficient energy to excite quantum dots capable of producing any color of visible light. In some embodiments light between about 350 and about 500 nanometers will have sufficient energy. In some embodiments, the light source emits a narrow range of wavelengths or a single wavelength. For example, a laser may emit a single high energy wavelength or an ultraviolet LED source may emit a high energy narrow band of wavelengths between 390 and 400 nm. In other embodiments a broader range of wavelengths may be provided such as a blue LED emitting wavelengths between 420 nm and 500 nm. The light source typically illuminates features of the exterior surface from within the electronic device; however external light sources may also be used.

Defining 502 the area of the exterior surface that is illuminable by the internal light source may involve defining an area of a button, keypad, key or other portion of the exterior surface of the electronic device to receive a feature that provides a visual cue to a user interacting with the electronic device. Defining 502 the area may involve defining an area on top of, within or beneath a light transmissive material comprising a portion of the exterior surface of the electronic device.

Quantum dots can be applied 504 to an area of the external surface of an electronic device in a variety of manners. Quantum dots can be mixed into a stamp, adhesive, paint, or coating that is applied to an area of an exterior surface of an electronic device. Quantum dots can also be mixed into a film or filter that comprises part of the exterior surface. The quantum dots can be applied beneath a protective exterior coating exterior surface, or, where the exterior surface comprises a light transmissive material, the area the quantum dots are applied to can be internally within or beneath the exterior surface.

The quantum dots may be applied 504 to the area of the exterior surface such that they can be illuminated by external light sources and emit light at their predetermined wavelengths. Other colored particles such as colorants, pigments and dyes may also be included in the quantum dot mixture to improve visibility of the features in environments with more external light in the visible spectrum than at higher energies.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to generate alternative embodiments comprised of a sub-combination of features which may not be explicitly described above. In addition, features from one or more of the above-described embodiments may be selected and combined to generate alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An electronic device comprising:
   a housing having an exterior surface which includes a light transmissive portion;
   a light source contained within the housing to illuminate the light transmissive portion; and
   a plurality of quantum dots to located on the light transmissive portion of the exterior surface of the housing and forming a visual feature defining visual indicia, the plurality of quantum dots emitting a spectrum of light in response to illumination from the light source.

2. The electronic device of claim 1 wherein the exterior surface is a button and the light transmissive portion is a part of the button.

3. The electronic device of claim 1 wherein the exterior surface is a key of a keyboard or keypad and the light transmissive portion is a part of the key.

4. The electronic device of claim 1 wherein the light transmissive portion is formed of a light transmissive material.

5. The electronic device of claim 1 wherein the plurality of quantum dots are formed by a mixture which comprises at least one of a colorant, a pigment and a dye.

6. The electronic device of claim 1 wherein the plurality of quantum dots are formed by a mixture which comprises any one of a paint, a film, a coating, an in-mold decoration or a filter.

7. The electronic device of claim 1 wherein the light source comprises any one of an ultraviolet light, a light emitting diode or a backlight.

8. The electronic device of claim 1 wherein the light source produces light between about 350 and about 500 nanometers in wavelength.

9. The electronic device of claim 1 wherein the plurality of quantum dots emit light in the visible spectrum in response to illumination from the light source.

10. The electronic device of claim 1 wherein the electronic device is a handheld electronic device.

11. The electronic device of claim 1 wherein the visual indicia is a letter, number, shape, symbol, trademark or logo.

12. A keypad for an electronic device having an internal light source, the keypad comprising:
    a plurality of keys each having an exterior surface which includes a light transmissive portion; and
    a plurality of quantum dots located on the light transmissive portion of the exterior surface of the housing and forming a visual feature defining visual indicia, the plurality of the quantum dots emitting a spectrum of light in response to illumination from the light source.

13. The keypad of claim 12 wherein the light transmissive portion is formed of a light transmissive material.

14. The keypad of claim 12 wherein the plurality of quantum dots are formed by a mixture which comprises at least one of a colorant, a pigment and a dye.

15. The keypad of claim 12 wherein the plurality of quantum dots are formed by a mixture which comprises any one of a paint, a film, a coating, an in-mold decoration or a filter.

16. The keypad of claim 12 wherein the plurality of quantum dots emit light in the visible spectrum in response to illumination from the light source.

17. The keypad of claim 12 wherein the light source is integrated into the keypad.

18. The keypad of claim 12 wherein the visual indicia is a letter, number, shape, symbol, trademark or logo.

19. The keypad of claim 12 wherein the keypad is a keyboard.

20. A method for providing a visual feature on an exterior surface of a housing of an electronic device having an internal light source, the exterior surface of the housing including a light transmissive portion, the method comprising:

defining an area of the light transmissive portion of the exterior surface of the housing of the electronic device that is illuminable by the internal light source; and applying a plurality of quantum dots to the area in a shape and color of the visual feature so as to define visual indicia, the plurality of quantum dots emitting a spectrum of light in response to illumination from the light source.

21. The method of claim 20 wherein applying the plurality of quantum dots comprises applying a mixture including plurality of quantum dots and at least one of a colorant, a pigment and a dye.

22. The method of claim 20 wherein applying the plurality of quantum dots comprises any one of applying a paint, applying a film, applying a coating, applying an in-mold decoration or inserting a filter containing the plurality of quantum dots.

23. The method of claim 20 wherein the visual indicia is a letter, number, shape, symbol, trademark or logo.

\* \* \* \* \*